(12) United States Patent
Cambrea et al.

(10) Patent No.: US 12,153,162 B2
(45) Date of Patent: Nov. 26, 2024

(54) GROUND BASED RADAR CROSS SECTION MEASUREMENT OF COUNTERMEASURES

(71) Applicant: The United States of America, as represented by the Secretary of the Navy, Crane, IN (US)

(72) Inventors: Lee R. Cambrea, Bloomington, IN (US); Terry L. Chastain, Bedford, IN (US); Zachary A. Masner, Bloomington, IN (US); Eric Alan Hillenbrand, Evansville, IN (US)

(73) Assignee: The United States of America Represented by the Secretary of the Navy, Washington, DC (US)

(*) Notice: Subject to any disclaimer, the term of this patent is extended or adjusted under 35 U.S.C. 154(b) by 345 days.

(21) Appl. No.: 17/674,971

(22) Filed: Feb. 18, 2022

(65) Prior Publication Data
US 2022/0260675 A1   Aug. 18, 2022

Related U.S. Application Data

(60) Provisional application No. 63/150,687, filed on Feb. 18, 2021.

(51) Int. Cl.
*G01S 7/41* (2006.01)
*G01S 7/03* (2006.01)
*G01S 13/88* (2006.01)

(52) U.S. Cl.
CPC ............... *G01S 7/41* (2013.01); *G01S 7/038* (2013.01); *G01S 13/88* (2013.01)

(58) Field of Classification Search
CPC ............ G01S 7/41; G01S 7/038; G01S 13/88
(Continued)

(56) References Cited

U.S. PATENT DOCUMENTS

| 3,765,336 A | * | 10/1973 | Kulsik | ............... F42B 12/70 |
| | | | | 102/505 |
| 3,866,226 A | * | 2/1975 | Benneche | ............... F41G 3/2622 |
| | | | | 273/362 |

(Continued)

FOREIGN PATENT DOCUMENTS

| EP | 3396402 A1 | * | 10/2018 | ........... G01R 29/105 |
| GB | 2458123 A | * | 9/2009 | ........... G01S 13/767 |

*Primary Examiner* — Nuzhat Pervin
(74) *Attorney, Agent, or Firm* — Naval Surface Warfare Center, Crane Division; Patrick Law

(57) ABSTRACT

Disclosed are apparatus and methods for determining a radar cross section (RCS) of countermeasure units such as chaff that utilizes ground level testing. An antenna platform is provided that is mounted to a support member at ground level and includes a radar transmit antenna disposed on the antenna platform, a radar receive antenna disposed on the antenna platform, and radar attenuating material disposed on the antenna platform linearly between the transmit antenna and the receive antenna for attenuating linear transmission of signals between the transmit antenna to the receive antenna. Additionally, low power transmitters used to enable safe ground testing are coupled to the transmit antenna for transmitting radar RF signals toward dispersed countermeasure units above the platform and also network analyzers coupled to the receive antenna that are capable of measuring the low power RF signals reflected by the dispersed countermeasure units.

20 Claims, 4 Drawing Sheets

(58) Field of Classification Search
USPC .......................................................... 342/175
See application file for complete search history.

(56) References Cited

U.S. PATENT DOCUMENTS

| | | | | |
|---|---|---|---|---|
| 4,215,630 A * | 8/1980 | Hagelberg | ............... | B63G 9/02 |
| | | | | 89/36.17 |
| 4,454,513 A * | 6/1984 | Russell | ..................... | G01S 7/40 |
| | | | | 342/174 |
| 4,980,688 A * | 12/1990 | Dozier, Jr. | ................. | F41J 2/00 |
| | | | | 342/9 |
| 5,012,248 A * | 4/1991 | Munro | ................. | G01B 15/025 |
| | | | | 342/124 |
| 5,163,176 A * | 11/1992 | Flumerfelt | .......... | G01S 13/9092 |
| | | | | 342/174 |
| 5,173,702 A * | 12/1992 | Young | ..................... | G01S 13/90 |
| | | | | 342/17 |
| 5,173,707 A * | 12/1992 | Mangiapane | ........... | G01S 13/90 |
| | | | | 342/149 |
| 5,175,554 A * | 12/1992 | Mangiapane | ....... | G01S 13/9092 |
| | | | | 342/149 |
| 5,185,381 A * | 2/1993 | Ruffoni | ..................... | C08J 9/42 |
| | | | | 252/511 |
| 5,245,347 A * | 9/1993 | Bonta | ......................... | G01S 7/36 |
| | | | | 342/149 |
| 5,296,860 A * | 3/1994 | Li | ........................... | G01S 7/003 |
| | | | | 342/126 |
| 6,043,769 A * | 3/2000 | Rowe | ................... | H01Q 17/008 |
| | | | | 428/113 |
| 6,614,381 B1 * | 9/2003 | Gross | ......................... | G01S 7/38 |
| | | | | 342/14 |
| 6,650,270 B1 * | 11/2003 | Lewis | ...................... | H01P 5/04 |
| | | | | 342/19 |
| 6,710,737 B1 * | 3/2004 | Cronyn | ................. | G01S 7/4052 |
| | | | | 342/174 |
| 6,980,151 B1 * | 12/2005 | Mohan | .................... | G01S 7/414 |
| | | | | 342/27 |
| 7,333,050 B2 * | 2/2008 | Svy | ......................... | G01S 7/024 |
| | | | | 342/172 |
| 7,369,081 B1 * | 5/2008 | Ganz | ................... | H01Q 15/145 |
| | | | | 342/12 |
| 8,179,299 B1 * | 5/2012 | Geer | ..................... | G01S 13/449 |
| | | | | 342/13 |
| 8,648,306 B1 * | 2/2014 | Goertz | ................... | G02B 1/002 |
| | | | | 250/340 |
| 8,947,295 B2 * | 2/2015 | Collins | ................. | G01S 7/4052 |
| | | | | 342/52 |
| 9,423,495 B1 * | 8/2016 | Chang | ................. | G01S 13/0218 |
| 10,629,996 B2 * | 4/2020 | Hurzon | ..................... | G01S 7/38 |
| 10,703,451 B1 * | 7/2020 | Adams | ..................... | F41F 3/10 |
| 10,731,959 B1 * | 8/2020 | Lovseth | .................. | H01Q 1/28 |
| 11,532,869 B2 * | 12/2022 | Spalink | .................. | H01Q 21/08 |
| 11,546,068 B2 * | 1/2023 | Molisch | ................. | H04B 17/391 |
| 11,581,654 B2 * | 2/2023 | Hurzon | .................. | F42B 12/70 |
| 11,733,349 B2 * | 8/2023 | Kuzdeba | ................. | G01S 7/021 |
| | | | | 342/16 |
| 11,750,303 B2 * | 9/2023 | Vanwiggeren | ....... | H04B 17/102 |
| | | | | 455/67.12 |
| 11,804,913 B2 * | 10/2023 | Zhuang | ................ | H04B 17/354 |
| 2005/0275582 A1 * | 12/2005 | Mohan | .................. | G01S 7/003 |
| | | | | 342/27 |
| 2008/0018525 A1 * | 1/2008 | Svy | ......................... | G01S 7/024 |
| | | | | 342/172 |
| 2012/0119933 A1 * | 5/2012 | Manela | ..................... | G01S 7/38 |
| | | | | 342/14 |
| 2012/0161762 A1 * | 6/2012 | Zank | ......................... | G01V 3/14 |
| | | | | 324/309 |
| 2013/0321200 A1 * | 12/2013 | Henderson | ............ | G01S 13/589 |
| | | | | 342/26 D |
| 2014/0002297 A1 * | 1/2014 | Collins | ................. | G01S 13/003 |
| | | | | 342/175 |
| 2014/0292561 A1 * | 10/2014 | Vacanti | .................... | H01Q 3/34 |
| | | | | 342/149 |
| 2015/0285906 A1 * | 10/2015 | Hooper | .................. | G01S 13/89 |
| | | | | 342/21 |
| 2016/0320478 A1 * | 11/2016 | Hooper | ................. | G01S 13/883 |
| 2017/0045613 A1 * | 2/2017 | Wang | .................. | G01S 13/343 |
| 2017/0352963 A1 * | 12/2017 | Hurzon | ...................... | F41J 2/00 |
| 2018/0011180 A1 * | 1/2018 | Warnick | ............... | H01Q 21/064 |
| 2018/0231651 A1 * | 8/2018 | Charvat | ................. | G01S 7/282 |
| 2020/0191945 A1 * | 6/2020 | Leabman | ................ | G01S 7/282 |
| 2020/0195197 A1 * | 6/2020 | Leabman | ................ | H04B 7/08 |
| 2020/0388931 A1 * | 12/2020 | Hurzon | ..................... | G01S 7/38 |
| 2020/0403307 A1 * | 12/2020 | Ahmadloo | ............. | G01S 7/038 |
| 2021/0218149 A1 * | 7/2021 | Dobsicek Trefna | . | A61B 5/0507 |
| 2021/0223381 A1 * | 7/2021 | Lovseth | .................. | H04W 4/029 |
| 2022/0047208 A1 * | 2/2022 | Shin | ........................ | A61B 5/11 |
| 2022/0192510 A1 * | 6/2022 | Leabman | ................ | H01Q 1/273 |
| 2023/0045798 A1 * | 2/2023 | Kim | .................... | H04B 17/3912 |
| 2023/0335912 A1 * | 10/2023 | Hurzon | ..................... | G01S 7/38 |

* cited by examiner

GROUND BASED RADAR CROSS SECTION MEASUREMENT OF COUNTERMEASURES

CROSS-REFERENCE TO RELATED APPLICATIONS

The present application claims priority to U.S. Provisional Patent Application Ser. No. 63/150,687 filed Feb. 18, 2021, entitled "GROUND BASED RADAR CROSS SECTION MEASUREMENT OF COUNTERMEASURES," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention is assigned to the United States Government and is available for licensing for commercial purposes. Licensing and technical inquiries may be directed to the Technology Transfer Office, Naval Surface Warfare Center Crane, email: Cran_CTO@navy.mil.

FIELD

The present invention generally relates to radar testing, and more particularly to methods and apparatus for determining a radar cross section (RCS) of countermeasure units during ground testing.

BACKGROUND

Currently, manufactured countermeasure means or units, such as chaff and the like, are physically inspected (i.e., inspected for size, markings, etc.), but they are not tested for function (i.e., radar cross section) in a quality control setting, such as with lot acceptance testing (LAT). Radar cross section (RCS) measurement of countermeasure units is currently only measured during flight-testing.

Additionally, RCS measurement generally is only performed either at a very small scale (i.e., to collect data for modeling) or at a very large scale (i.e., to determine the signature of a ship or aircraft during field operations). Small scale testing utilizes extremely low power devices and testing occurs nearly exclusively in anechoic chambers. On the other hand, large scale testing utilizes high-powered devices, which can be hazardous, and is performed outdoors, generally with a clear sky background. Accordingly, being able to perform ground testing of radar countermeasure units with lower powered transmitters would be beneficial.

SUMMARY

The present disclosure provides apparatus and methods to allow for ground testing of radar countermeasure units. This medium range setup utilizes relatively low powered (e.g., about 10 ft. safety distance) transmitters and is portable to allow testing either outdoors or indoors. Testing occurs at ground level so the conventional need for a clear sky background to perform testing is not necessary. In terms of precision and accuracy, the medium range measurement falls between the small and large scales.

According to one aspect, apparatus and methods are disclosed for determining a radar cross section (RCS) of countermeasure units such as chaff that utilizes ground level testing. An antenna platform is provided that is mounted to a support member at ground level and includes a radar transmit antenna disposed on the antenna platform, a radar receive antenna disposed on the antenna platform, and radar attenuating material disposed on the antenna platform linearly between the transmit antenna and the receive antenna for attenuating linear transmission of signals between the transmit antenna to the receive antenna. Additionally, low power transmitters used to enable safe ground testing are coupled to the transmit antenna for transmitting radar RF signals toward dispersed countermeasure units above the platform and also network analyzers coupled to the receive antenna that are capable of measuring the low power RF signals reflected by the dispersed countermeasure units.

BRIEF DESCRIPTION OF THE DRAWINGS

The detailed description particularly refers to the accompanying figures in which.

DETAILED DESCRIPTION

Figure 1:
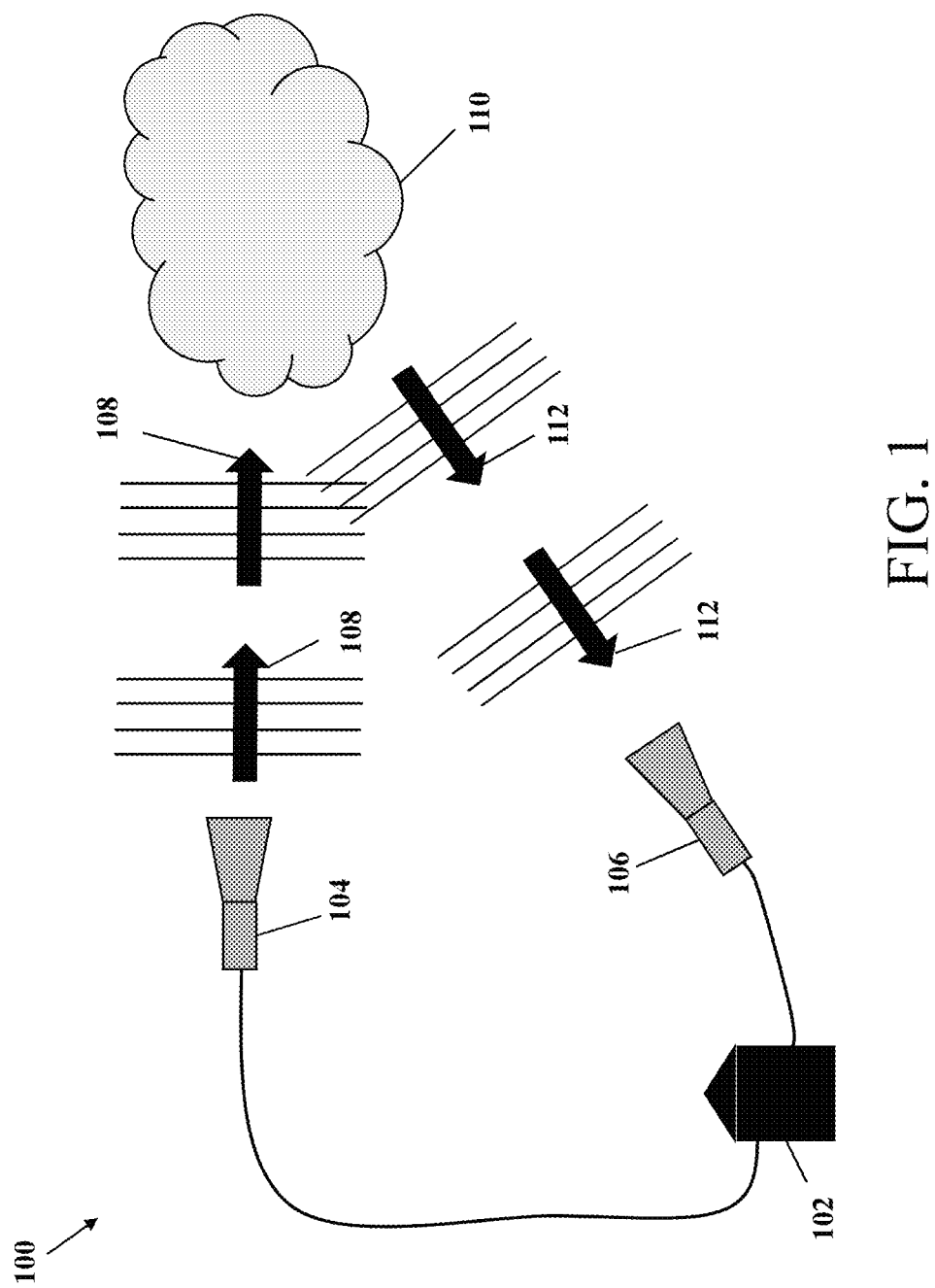
FIG. 1 illustrates a diagram of an exemplary radar system according to some aspects.

The embodiments of the invention described herein are not intended to be exhaustive or to limit the invention to precise forms disclosed. Rather, the embodiments selected for description have been chosen to enable one skilled in the art to practice the invention.

In the world of countermeasures, it is necessary that units behave consistently. Testing to make sure that manufactured countermeasures do not vary throughout production, and, thus, behave consistently, is called Lot Acceptance Testing (LAT). LAT works by initially testing a large amount of "good" units and using the data acquired to set benchmarks for units produced later. The benchmarks used for LAT should be directly related to the key factors that make a countermeasure effective. Infrared (IR) countermeasures (IRCM), for example, use properties like intensity as a key factor.

Of further note, LAT is not testing whether or not the individual countermeasure is effective, but is only determining that the unit is similar to previously deemed "good" units by using the established earlier benchmarks. Therefore, LAT focuses on repeatability between individual tests so that any variance can be attributed solely to the quality of production.

Radar countermeasures, such as chaff, create large clouds of small, metal coated, glass fibers. The metal coatings allow the fibers to act as dipoles that can reflect radar. That reflectivity, when coupled with a wide dispersal, creates a large RCS. The large RCS prevents an enemy's RF seeker from locking onto a user's aircraft, for example.

Currently, radar countermeasures such as chaff units are tested in two ways. The first test is a simple function test (e.g., did the unit dispense properly?). The second test measures the size of the casing, length of the fibers, and appearance of markings. Although necessary tests, neither test directly examines RCS, which is one of the key factors that determines effectiveness of the countermeasure units. In order to test effectiveness, countermeasure units such as chaff are functioned from an aircraft while seeker threats are monitored to see if they break their lock on the aircraft. This method of testing is extremely costly and time intensive. Additionally, regulations related to operating an aircraft, operating and maintaining the threats, and a limited number of units capable of being dispensed per flight (e.g., 30 units) further increase the complexity of flight testing. Moreover, because the chaff is released by a moving platform, the distance between the release point and the measurement devices will change for every test run. While measureable, this effect must be accounted for after every test. Furthermore, wind factors and turbulence can vary greatly throughout the testing process, which affects the way the chaff disperses.

Accordingly, the present disclosure provides for LAT methods and apparatus enabling medium range ground testing of countermeasure units such as chaff including enabling measurement of the RCS. This testing affords better quality units being manufactured and sent out to operators of the countermeasure units, such as the U.S. Navy fleet, with greater ease and safety, as well as with less cost of testing. Furthermore, the presently disclosed methods and apparatus afford medium range measurements for countermeasure units that can be performed both indoors and outdoors where portability is a requirement or where space is limited or an object cannot be easily moved to a large open area.

Turning to the figures, FIG. 1 illustrates a diagram of an exemplary radar system 100. The system includes a transmit/receive station or apparatus 102 which are coupled to at least one transmit antenna 104 and at least one receive antenna 106. The radar system 100 works by transmitting either continuous waves or pulses of electromagnetic radiation 108 with the transmit antenna 104 toward some target three-dimensional (3D) object 110 (e.g., an aircraft or countermeasure units) and, in turn, receiving reflected return pulses of electromagnetic radiation 112 with the receive antenna 106.

The return pulses 112 are then measured at station 102 to determine characteristics of the object 110. It is noted that the frequency of the transmitted radiation 108 depends on what the desired target constitutes. For example, weather stations use 8-12 GHz to detect storm clouds. The ratio between the transmitted and returned signals is used to calculate a two dimensional (2D) projected area of the 3D object (e.g., 110) as measured by the radar waves. This ratio value represents the radar cross section (RCS) of the object. Equation 1 below shows how the RCS ($\sigma_c$) for a sphere, for example, may be calculated.

$$\sigma_c = \frac{(4\pi)^3 * R^4 * S_r}{S_t * G_t * G_r * \lambda^2} \quad (1)$$

Here, "R" is the range or distance to the object; "$S_r$" and "$S_t$" are the return and transmitted powers, respectively, "$G_t$" and "$G_r$" are the gains of the transmit and receive antennas, respectively, and "$\lambda$" is the wavelength of the radiation used.

Unlike infrared countermeasures, radar chaff, for example, is passive, which means that it does not produce its own signature. Instead, chaff is designed to reflect radar. Accordingly, a source of radar energy directed at the chaff is needed to measure the chaff's RCS. While it is contemplated that any of a number of frequencies could be used in the radar source, given chaff's uses in certain frequency bands, at least two bands of radar may be implemented for optimal testing of the chaff: (1) X-band (8-12 GHz), and Ka-band (26.5-40 GHz.), as will be discussed in more detail below with regard to an exemplary testing apparatus.

Figure 2:
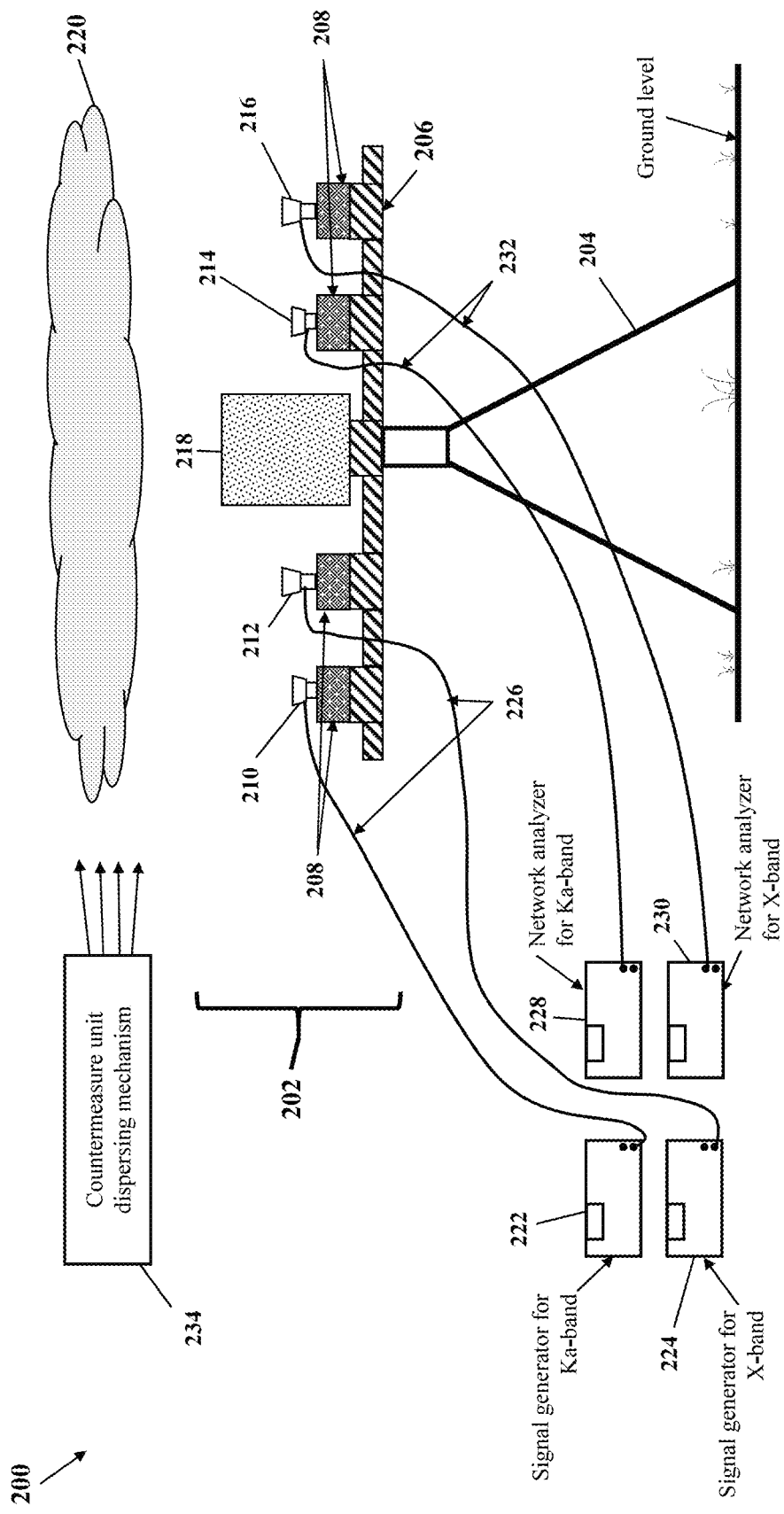
FIG. 2 illustrates a diagram of the presently disclosed measurement apparatus or setup according to some aspects.

FIG. 2 illustrates an apparatus 200 for ground testing of countermeasure units to determine an RCS of the countermeasure units according to some aspects of the disclosure. As shown, apparatus 200 includes an antenna platform shown generally at 202. The antenna platform 202 is mounted on a support member 204 at ground level that raises the platform 202 some distance above the ground level. In aspects, the distance above ground level may be from approximately 1 foot to six (6) feet, but the invention is not limited to such. The antenna platform 202 itself includes an underlying support frame or member 206, such as a tripod, upon which are mounted one or more antenna stages 208. Antenna stages 208 are, in turn, used for mounting of one or more transmit antennas 210 and 212 and one or more receive antennas 214 and 216. In the illustrated example, two transmit/receive pairs of antennas (e.g., 210/214 and 212/216), which each respectively are operated at different frequencies, are illustrated to provide testing using two different radar frequency bands (as will be discussed in more detail later). It is noted, however, that the present disclosure is not limited to two pairs of transmit/received antennas and the platform 202 may include only one transmit/receive pair of antennas or, alternatively, three or more transmit/receive pairs of antennas, each operated at a respective frequency band.

The antenna platform 202 also includes radar attenuating material 218 located or disposed on the antenna platform 202 between the transmit antennas (e.g., 210 and/or 212) and the receive antennas (e.g., 214 and/or 216) for attenuating direct or linear transmission of signals between the transmit antennas and the receive antennas. As illustrated, the radar attenuating material 218 is disposed linearly between the transmit and receive antennas along a direction parallel to the top surface of the support frame 206 to attenuate or impede the linear transmission of RF signals directly from a transmit antenna such as antenna 210 or 212 to a receive antenna 214 or 216 (i.e., cross talk where some of the broadcasted signal bleeds over to the receiver without reflecting) such that all or at least a significant portion of the RF signals received by antenna 214 or 216 will be those signals transmitted from the transmit antennas 210 or 212 that are reflected off countermeasure units 220 spatially dispersed in a volume at some optimal height range above the apparatus 200 during testing. Additionally, a height of the radar attenuating material 218 above the platform 202 is configured to ensure that sufficient RF signal attenuation is effectuated with little or no spillover of direct RF signal transmissions between the transmit and receive antennas. It is noted that the radar attenuating material 218 may be composed of various materials including, but not limited to, foam absorbers such as polyurethane foam that is carbon loaded with conductive carbon black and/or crystalline graphite particles, Holland shielding (e.g., 3650-40-ML-PU), rubberized foam with carbon and iron impregnated therein, ferrite materials, semiconductors, graphite, carbon nanotubes, iron ball paint (i.e., tiny spheres coated with carbonyl iron or ferrite), or carbon nanotube based paints. Further, while the geometry of the radar attenuating material 218 shown in FIG. 2 is illustrated in block form, the geometry of the material 218 may be configured according to any of a number of geometries in order to provide optimal or maximum radar attenuation.

The system 200 may further include one or more signal generators configured to generate radar signals at certain frequencies or wavelengths and then transmit those signals via the transmit antennas (e.g., 210 or 212). In the example of FIG. 2 a first signal generator 222 may be configured to generate signals in the X-band (i.e., 8-12 GHz) and a second signal generator 224 may be configured to generate signals in the Ka-band (i.e., 26.5-40 GHz). These generators are exemplary of typical bands used for radar transmissions, and the disclosure is not necessarily limited to such. The signal generators 222 and 224 are communicatively coupled to respective antennas such as antenna 210 and 212 via power output cables 226 to deliver and drive the signals for transmission by the antennas. Of note, the length of the power output cables 226 is sized to allow safe operating distance between the transmit antennas 210 or 212 and personnel operating the system at the signal generators 222 and 224.

System 200 further includes one or more signal or network analyzers configured to receive reflected radar signals received by the receive antennas (e.g., 214 and/or 216) in order to determine an RCS of the countermeasure units 220. In the example of FIG. 2 a first signal or network analyzer 228 may be configured to receive and analyze signals in the X-band received by antenna 214 and a second signal or network analyzer 230 configured to receive and analyze signals in the Ka-band received by antenna 216. The first and second network analyzers 228 and 230 may be communicatively coupled to the receive antennas 214 and 216 via power receive cables 232, which are configured with a length allowing safe operating distance between the antennas and personnel operating the system at the network analyzers 228 and 230.

It is noted here that, given the difficulty with timing a single antenna's pulses with the returning signals, the system 200 of FIG. 2 is designed so that at least two antennas (i.e., a transmit and a receive antenna) are used for each band. Additionally, both the X-band and Ka-band antennas disclosed are configured to provide a moderately focused beam (and therefore gain). This ensures that minimal radar power is lost and the beam covers the full spread of the countermeasure units (e.g., 220) over time. As discussed above, using two antennas (i.e., a transmit/receive pair) can lead to the potential for cross talk and, thus, the attenuating material 218 placed between the antennas of a transmit/receive pair of antennas decreases the cross talk to virtually zero.

When testing countermeasure units, such as chaff, associated with system 200, but not necessarily part of system 200, is a countermeasure unit dispersing unit 232 that is configured to release and disperse the countermeasure units into a spatial volume above the antenna platform 202 as visualized by the cloud of countermeasure units 220 in FIG. 2. In one example, the countermeasure unit dispersing unit 232 may include utilization of a Windstream facility, which allows for controlled airflow (e.g., air speed and flow pattern) across the countermeasure units during testing to allow for consistent dispersion. Variances in the measurement distances are eliminated by fixing the dispensing unit 232 and the antenna platform 202 location during testing. Although there will be more background noise in such an arrangement than in clear air (i.e., trees, cars, and buildings), by releasing the countermeasure units in the same area, the background noise can be reduced by zeroing it out every time before firing or dispersing a countermeasure unit. While testing countermeasure units in a Windstream facility will not mimic an aircraft, it is not necessary to do so for LAT. This is because repeatability between tests is the primary goal of LAT. The benchmarks are then constructed from tests of known "good" units under the same conditions as later units. In aspects, the distance of the countermeasure units 220 above the antenna platform 202 may be in an approximate range of 15 to 50 feet above the platform, but the disclosure is not necessarily limited to such.

Of further note, a potential issue during testing may be that the return signal is too low and is hidden under the noise floor. In this case, the setup can be moved closer to the functioning point of the countermeasure units, which will increase the return signal power proportionally to 1/distance$^4$. If the antenna spread does not allow the setup to be moved closer to the dispersed countermeasure units, amplifiers (not shown) can be added to the system 200 to boost the transmitted and received powers.

Concerning the determination of the RCS using the system 200, it is first noted that rearranging Equation 1 above to solve for return power $S_r$, yields the following Equation 2:

$$S_r = S_t * \frac{(\sigma_c * G_t * G_r * \lambda^2)}{(4\pi)^3 * R^4} \qquad (2)$$

Use of Equation 2 allows equipment setups to be modeled to determine what pairings of equipment will work best together. The primary focus of the equation is on return power versus transmitted power.

Table 1 below illustrates one example of the return power for varying transmitted powers at 9.3 GHz with: a one square meter (1 m$^2$) RCS target at a range of 50 feet, and moderately focused transmit and receive antennas with gains of 22.1 isotropic antenna power gain (i.e., dBi).

TABLE 1

| Power Transmitted [dBm] | Power Transmitted [mW] | Power Returned [mW] | Power Returned [dBm] |
|---|---|---|---|
| 0 | 1 | 3.64E–09 | –83.2 |
| 5 | 3.16 | 1.15E–08 | –78.2 |
| 10 | 10 | 3.64E–08 | –73.2 |
| 15 | 31.62 | 1.15E–07 | –68.2 |
| 20 | 100 | 3.64E–07 | –63.2 |

As may be inferred from the data in Table 1 above, large losses will result during testing of countermeasure units where significantly less power is returned than was transmitted. This means that the signal generator (e.g., generator 224 or generator 226) needs to drive transmission at or above some minimum power level and the signal analyzer needs to be sensitive enough so that the return signal can be measured. In one example, a signal generator was utilized that affords an output 21 decibel-milliwatts (dBm) peak power at 9.3 GHz, which theoretically allows for an approximate –62 dBm return given the same setup as in Table 1. In the Ka-band, the same generator with antenna gains of 20 dBi can output 20 dBm at 35 GHz allowing for a return of –75 dBm. Due to non-ideal conditions, the return signals are expected to be less than those calculated in Table 1. This means that most of the basic power sensors on the market would be unable to pick the return signal out of the noise. Accordingly, network analyzers, such as analyzers 228 and 230, are utilized to be able to measure signals down to much lower power when making RCS measurements at 50 ft, for example. The invention, however, is not limited to such and any equivalent device capable of measuring low power signals may be utilized in the system 200. In further aspects, the analyzers 228 and 230 may be configured to calculate and/or determine the RCS of the countermeasure units from the measured signals, such as through implementation of equations (1) and/or (2) above.

Figure 3:
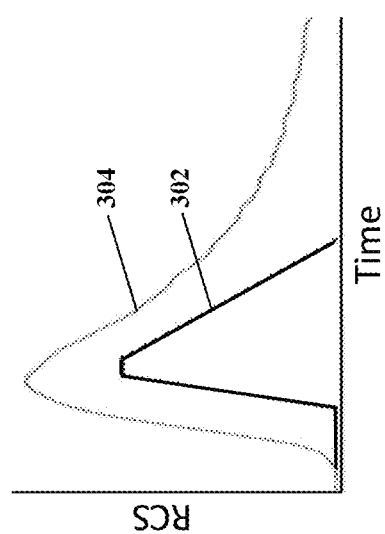
FIG. 3 illustrates a graph showing acceptance criteria for countermeasure unit testing according to some aspects.

In operation, a calibration RCS, ideal RCS, "good" RCS, or some desired RCS may be established using the apparatus 200, another apparatus, or theoretical calculations prior to the actual the LAT testing of countermeasure units with apparatus 200. The testing of each unit or each lot of countermeasure units can then be compared against the calibration RCS to determine whether or not the countermeasure unit is acceptable. FIG. 3 illustrates a graph showing acceptance criteria for a test of counter measure units. The plot 302 illustrates a lower limit or "envelope" threshold. Plot 304 illustrates data derived from testing an actual unit showing that it meets the minimum set criteria for a "passing" unit.

In other aspects, it is noted that calibration of the system 200 may be performed using a series of varying sized RF calibration spheres with known RCS values. A plot may be made from the power returned or RCS of the known spheres. Data (i.e., power returned) from the unknown chaff is then calculated from the calibration sphere data (curve fitting).

Figure 4:
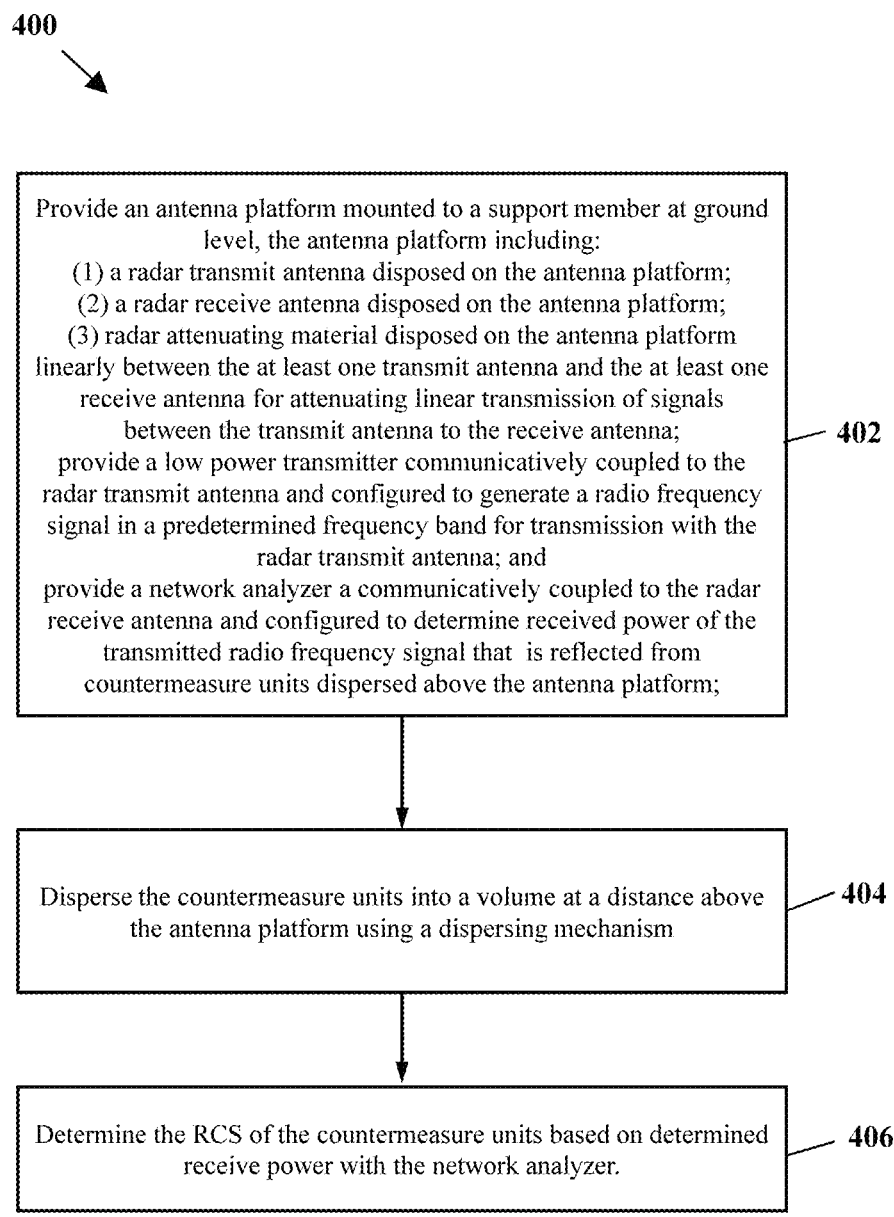
FIG. 4 illustrates a flowchart of a method for testing the RCS of countermeasure units using the apparatus of FIG. 2.

FIG. 4 illustrates a method 400 for countermeasure testing using the apparatus of FIG. 2. As illustrated, method 400 is a method, in particular, for determining a radar cross section (RCS) of countermeasure units utilizing ground level testing. The method 400 includes at block 402 providing an antenna platform mounted to a support member at ground level, where the antenna platform includes a radar transmit antenna disposed on the antenna platform, a radar receive antenna disposed on the antenna platform, and radar attenuating material disposed on the antenna platform linearly between the at least one transmit antenna and the at least one receive antenna for attenuating linear transmission of signals between the transmit antenna to the receive antenna such as the platform 202 shown in FIG. 2, as one example. The processes of block 402 further include providing a low power transmitter communicatively coupled to the radar transmit antenna and configured to generate a radio frequency signal in a predetermined frequency band for transmission with the radar transmit antenna, and providing a network analyzer a communicatively coupled to the radar receive antenna and configured to determine received power of the transmitted radio frequency signal that is reflected from countermeasure units dispersed above the antenna platform.

At block 404, method 400 further includes dispersing the countermeasure units into a volume at a distance above the antenna platform using a dispersing mechanism, such as mechanism 234 discussed above in connection with FIG. 2. Finally, method 400 includes determining the RCS of the countermeasure units based on determined receive power with the network analyzer as shown in block 406.

It is noted that in one example, the cost of the total setup of signal generators, network analyzer(s), antennas, cabling, and mounting hardware is estimated at $406,000. The further cost of operation for ground testing RCS during LAT would be expected to cost $15,000 per test. In comparison, flight tests may only be conducted a few times per year at an operational cost of $100,000 per test. Accordingly, the present apparatus and methods are expected to improve radar chaff quality control and save significant costs over the long term, while increasing the total amount of testing that is able to be performed.

Although tests are designed for the X and Ka wavelength bands, measurements can be performed at any wavelength desired by utilizing appropriate antennas, signal generators, and signal analyzers. The present invention provides a commercial value for any company wanting to make a product or materials with specific radar characteristics and providing a lower cost means for testing the product in a limited space. Companies manufacturing RF will benefit from the use of the system for internal testing of quality control.

Although the present invention has been described in detail with reference to certain illustrated embodiments, variations and modifications exist within the spirit and scope of the invention as described and defined in the following claims.

The invention claimed is:

1. An apparatus for determining a radar cross section (RCS) of countermeasure units utilizing ground level testing, comprising:
   an antenna platform mounted to a support member at ground level, the antenna platform including:
      at least one first radar transmit antenna disposed on the antenna platform;
      at least one first radar receive antenna disposed on the antenna platform; and
      radar attenuating material disposed on the antenna platform linearly between the at least one transmit antenna and the at least one receive antenna for attenuating direct, non-reflected linear transmission of signals from the at least one first radar transmit antenna to the at least one first radar receive antenna.

2. The apparatus of claim 1, further comprising:
   the at least one radar receive antenna configured to transmit in the Ka-band frequencies or the X-band frequencies.

3. The apparatus of claim 1, further comprising:
   a first low power transmitter communicatively coupled to the at least one first radar transmit antenna and configured to generate a radio frequency signal for transmission with the at least one first radar transmit antenna.

4. The apparatus of claim 3, wherein the first low power transmitter is configured to operate in a range of approximately 20 to 21 decibel-milliwatts (dBm).

5. The apparatus of claim 1, further comprising:
   a first network analyzer communicatively coupled to the at least one radar receive antenna and configured to determine received power of a radio frequency signal reflected from one or more countermeasure units dispersed above the antenna platform.

6. The apparatus of claim 1, wherein the apparatus is used for lot acceptance testing of a plurality of countermeasure units.

7. The apparatus of claim 1, further including:
   a second radar transmit antenna disposed on the antenna platform; and
   a second radar receive antenna disposed on the antenna platform;
   wherein the second radar transmit antenna and the second radar receive antenna are located on the antenna platform such that the radar attenuating material is disposed on the linearly between the second radar transmit antenna and the second radar receive antenna.

8. The apparatus of claim 7, further comprising:
   a first low power transmitter communicatively coupled to the at least one first radar transmit antenna and configured to generate a first radio frequency signal in a first frequency band for transmission with the at least one first radar transmit antenna; and a second low power transmitter communicatively coupled to the second radar transmit antenna and configured to generate a second radio frequency signal in a second frequency band for transmission with the second radar transmit antenna.

9. The apparatus of claim 8, wherein the first frequency band comprises a Ka-band and the second frequency band comprises an X-band.

10. The apparatus of claim 8, wherein both the first and second low power transmitters are configured to operate in a range of approximately 20 to 21 decibel-milliwatts (dBm).

11. The apparatus of claim 7, further comprising:

a first network analyzer communicatively coupled to the at least one first radar receive antenna and configured to determine received power of a first radio frequency signal reflected from the countermeasure units when dispersed above the antenna platform; and a second network analyzer communicatively coupled to the second radar receive antenna and configured to determine received power of a second radio frequency signal reflected from the countermeasure units dispersed above the antenna platform.

12. The apparatus of claim 1, wherein the radar attenuating material comprises one or more of foam absorbers, polyurethane foam that is carbon loaded with conductive carbon black and/or crystalline graphite particles, Holland shielding, rubberized foam with carbon and iron impregnated therein, ferrite materials, semiconductors, graphite, carbon nanotubes, iron ball paint, or carbon nanotube based paint.

13. The apparatus of claim 1, further comprising:

a countermeasure dispersing mechanism configured to disperse the countermeasure units into a volume at a distance above the antenna platform for testing of the countermeasure units.

14. The apparatus of claim 13, wherein the distance is in a range of approximately 15 to 50 feet above the antenna platform.

15. The apparatus of claim 13, wherein the countermeasure dispersing mechanism includes a Windstream unit configured to control airflow across the countermeasure units during testing to allow for consistent dispersion.

16. The apparatus of claim 1, wherein the countermeasure units comprise chaff.

17. A method for determining a radar cross section (RCS) of countermeasure units utilizing ground level testing, the method comprising:

providing:

an antenna platform mounted to a support member at ground level, the antenna platform including:

a radar transmit antenna disposed on the antenna platform;

a radar receive antenna disposed on the antenna platform; and radar attenuating material disposed on the antenna platform linearly between the at least one transmit antenna and the at least one receive antenna for attenuating direct, non-reflected linear transmission of signals from the at least one first radar transmit antenna to the at least one first radar receive antenna;

a low power transmitter communicatively coupled to the radar transmit antenna and configured to generate a radio frequency signal in a predetermined frequency band for transmission with the radar transmit antenna; and a network analyzer a communicatively coupled to the radar receive antenna and configured to determine received power of the transmitted radio frequency signal that is reflected from countermeasure units dispersed above the antenna platform;

dispersing the countermeasure units into a volume at a distance above the antenna platform using a countermeasure dispersing mechanism; and determining the RCS of the countermeasure units based on determined receive power with the network analyzer.

18. The method of claim 17, wherein the countermeasure units comprise chaff.

19. The method of claim 17, further comprising:

providing a first low power transmitter communicatively coupled to the radar transmit antenna and configured to generate a radio frequency signal for transmission with the radar transmit antenna.

20. The method of claim 17, wherein the radar attenuating material comprises one or more of foam absorbers, polyurethane foam that is carbon loaded with conductive carbon black and/or crystalline graphite particles, Holland shielding, rubberized foam with carbon and iron impregnated therein, ferrite materials, semiconductors, graphite, carbon nanotubes, iron ball paint, or carbon nanotube based paint.

* * * * *